(12) United States Patent
Leonardi et al.

(10) Patent No.: US 8,786,223 B2
(45) Date of Patent: Jul. 22, 2014

(54) CONTROLLING TORQUE RIPPLE IN INTERIOR PERMANENT MAGNET MACHINES

(75) Inventors: Franco Leonardi, Dearborn Heights, MI (US); Dean Richard Canini, Warren, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 363 days.

(21) Appl. No.: 13/273,699

(22) Filed: Oct. 14, 2011

(65) Prior Publication Data

US 2013/0093369 A1    Apr. 18, 2013

(51) Int. Cl.
     *H02P 21/00*    (2006.01)

(52) U.S. Cl.
     USPC ............ 318/400.02; 318/400.01; 318/400.23; 318/432

(58) Field of Classification Search
     USPC .................. 318/700, 400.01, 400.02, 400.15, 318/400.23, 400.34, 432
     See application file for complete search history.

(56) References Cited

U.S. PATENT DOCUMENTS

| | | | | |
|---|---|---|---|---|
| 6,025,691 A * | 2/2000 | Kawabata et al. | ............ | 318/700 |
| 6,927,548 B2 * | 8/2005 | Nishizaki et al. | ............. | 318/432 |
| 7,312,592 B2 * | 12/2007 | Maslov et al. | ................. | 318/432 |
| 7,768,220 B2 * | 8/2010 | Schulz et al. | ................. | 318/432 |
| 8,410,734 B2 * | 4/2013 | Ueda et al. | ............... | 318/400.02 |
| 8,410,735 B2 * | 4/2013 | Tobari et al. | ............. | 318/400.02 |
| 2002/0097015 A1 * | 7/2002 | Kitajima et al. | ............... | 318/432 |
| 2008/0211446 A1 * | 9/2008 | Kobayashi | ..................... | 318/611 |
| 2008/0246425 A1 | 10/2008 | Atarashi | | |
| 2009/0251096 A1 * | 10/2009 | Schulz et al. | ................. | 318/801 |

FOREIGN PATENT DOCUMENTS

JP    2009195049 A    8/2009

OTHER PUBLICATIONS

Chen et al.; High-efficiency, low-torque ripple control of a permanent magnet synchronous Motor based on current tracking vector of electromotive force; Journal: Electrical Engineering in Japan, vol. 136 Issue 1, pp. 57-64; Published Online: Apr. 6, 2001.

Kang et al.; A Current Control Scheme for Harmonic Suppression in Permanent Magnet Synchronous Motor for Hybrid Electric Vehicles; Publisher: Society of Automotive Engineers of Japan, Inc., Tokyo, Japan; JSAE Technical Paper No. 200454180919-1364 pp. 9-12; Date Published: May 19, 2004.

* cited by examiner

*Primary Examiner* — Bentsu Ro
*Assistant Examiner* — Thai Dinh
(74) *Attorney, Agent, or Firm* — David B. Kelley; Brooks Kushman P.C.

(57) ABSTRACT

A system for controlling a vehicle, the vehicle including a permanent magnet (PM) synchronous motor, includes a controller. The controller is configured to control the motor with a motor current. In the presence of a predetermined condition, the motor current results in increased winding loss and reduced torque ripple with respect to optimal motor current for minimal winding loss.

20 Claims, 4 Drawing Sheets

CONTROLLING TORQUE RIPPLE IN INTERIOR PERMANENT MAGNET MACHINES

TECHNICAL FIELD

The invention relates to torque ripple reduction in interior permanent magnet (PM) machines via control angle manipulation.

BACKGROUND

Hybrid electric vehicles (HEVs) use batteries as an energy storage system. The plug-in hybrid electric vehicle (PHEV) is an extension of existing hybrid electric vehicle (HEV) technology. A PHEV utilizes a larger capacity battery pack than a standard hybrid electric vehicle, and adds the capability to recharge the battery from a standard electrical outlet to decrease fuel consumption and to further improve the fuel economy in an electric driving mode or in a blended driving mode. There are also battery electric vehicle (BEV) applications where an electric machine completely replaces the internal combustion engine.

The HEV, PHEV, and BEV each include an electric motor drive system, which may include a permanent magnet (PM) synchronous motor. A PM synchronous motor includes a rotor having permanent magnets mounted on the rotor periphery or buried inside the rotor. The electric motor drive system generates torque ripples. The motor output torque contains torque ripples caused by the magnetic force variations depending on the rotor position of the motor.

In an existing approach to reducing torque ripple in interior permanent magnet (PM) machines, torque ripple is minimized via machine design.

Background information may be found in U.S. Pub. No. 2008/0246425A1 and in JP2009195049A.

SUMMARY

In one embodiment of the invention, a system for controlling a vehicle, the vehicle including a permanent magnet (PM) synchronous motor, includes a controller. The controller is configured to control the motor with a motor current. In the presence of a predetermined condition, the motor current results in increased winding loss and reduced torque ripple with respect to optimal motor current for minimal winding loss.

The controller may be further configured to establish a motor speed, and determine the presence of the predetermined condition based on whether the motor speed falls within a predetermined speed range. The presence of the predetermined condition may be further based on whether a torque command exceeds a predetermined value.

In one possible feature, in the presence of the predetermined condition, the motor current results in decreased control angle of at least 5 degrees with respect to optimal motor current for minimal winding loss.

In another embodiment of the invention, a method of controlling a vehicle including a permanent magnet (PM) synchronous motor is provided. The motor is calibrated such that for each torque command, there are corresponding direct axis (d-axis) and quadrature axis (q-axis) current commands. The method comprises establishing a torque command; determining d-axis and q-axis current commands Id and Iq, respectively, corresponding to the torque command; and controlling the motor based on Id, Iq. In the presence of a predetermined condition, Id and Iq result in increased winding loss and reduced torque ripple with respect to optimal Id and Iq for minimal winding loss.

Embodiments of the invention may include one or more of various additional features. In one feature, in the absence of the predetermined condition, Id and Iq result in reduced winding loss and increased torque ripple with respect to optimal Id and Iq for minimal torque ripple. In another feature, the method further comprises establishing a motor speed, and determining the presence of the predetermined condition based on whether the motor speed falls within a predetermined speed range. In another feature, the method further comprises determining the presence of the predetermined condition further based on whether the torque command exceeds a predetermined value.

In one possible feature, in the presence of the predetermined condition, Id and Iq result in increased peak current with respect to optimal Id and Iq for minimal winding loss.

In another possible feature, in the presence of the predetermined condition, Id and Iq result in decreased control angle of at least 5 degrees with respect to optimal Id and Iq for minimal winding loss.

In another embodiment, a system for controlling a vehicle including a permanent magnet (PM) synchronous motor is provided. The motor is calibrated such that for each torque command, there are corresponding direct axis (d-axis) and quadrature axis (q-axis) current commands. The system comprises a controller configured to establish a torque command; determine d-axis and q-axis current commands Id and Iq, respectively, corresponding to the torque command; and control the motor based on Id, Iq. In the presence of a predetermined condition, Id and Iq result in increased winding loss and reduced torque ripple with respect to optimal Id and Iq for minimal winding loss.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention includes various aspects of controlling torque ripple in interior permanent magnet (PM) machines via control angle manipulation. Motor controllers are typically tuned to minimize losses and maximize fuel efficiency. In accordance with the invention, motor controllers may be tuned to minimize torque ripple in certain conditions, for example, at certain motor speed and torque levels. In more detail, at a specific speed and torque level, the machine can be operated with control parameters that minimize ripple instead of loss.

Embodiments of the invention may be implemented in a variety of applications. One example is a hybrid electric vehicle powertrain.

Figure 1:
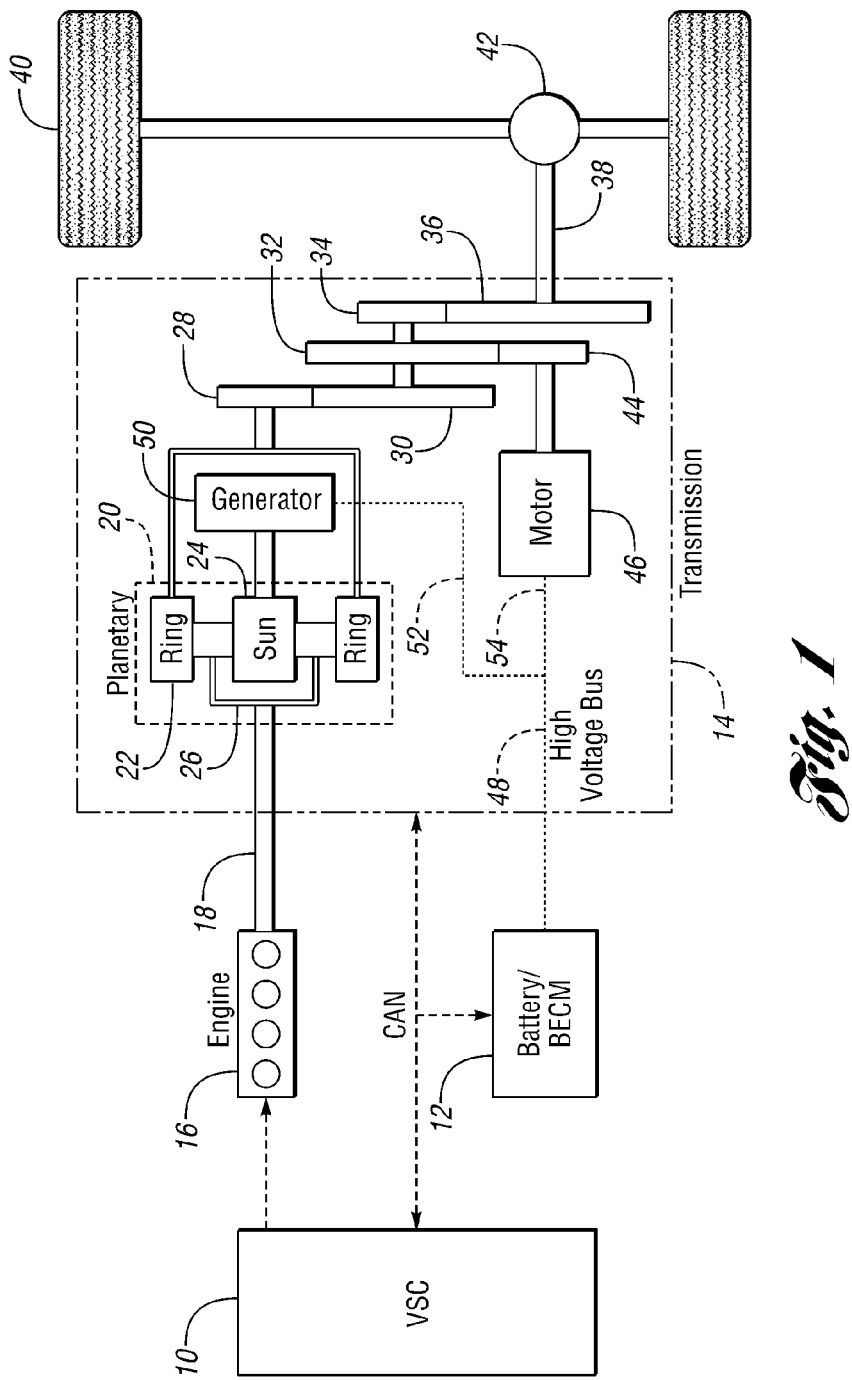
FIG. 1 is a schematic representation of a powersplit powertrain system configuration.

A hybrid electric vehicle powertrain is shown in FIG. 1. A vehicle system controller (VSC) 10, a battery and battery energy control module (BECM) 12, and a transmission 14, together with a motor-generator subsystem, comprise a control area network (CAN). An internal combustion engine 16, controlled by VSC 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34, and 36. A torque output shaft 38 for the transmission 14 is drivably connected to vehicle traction wheels 40 through a differential and axle mechanism 42.

Gears 30, 32, and 34 are mounted on a countershaft, with gear 32 engaging a motor-driven gear 44. Electric motor 46 drives gear 44, which acts as a torque input for the countershaft gearing.

The battery delivers electric power to the motor through power flow path 48, 54. Generator 50 is connected electrically to the battery and to the motor 46 in a known fashion as shown at 52.

The powersplit powertrain system of FIG. 1 may be operated in a variety of different modes as is appreciated by those skilled in the art. As shown, there are two power sources for the driveline. The first power source is a combination of the engine and generator subsystems, which are connected together using the planetary gear unit 20. The other power source involves the electric drive system including the motor 46, the generator 50, and the battery, where the battery acts as an energy storage medium for the generator 50 and the motor 46.

In general, VSC 10 calculates the total engine power needed to meet the drive wheel power demand plus all accessory loads, and independently schedules the engine speed and load operating point, with or without feedback of actual engine performance, to meet the total power demand. This type of approach is typically used to maximize fuel economy and may be used in other types of powertrain systems that have such VSCs.

Figure 2:
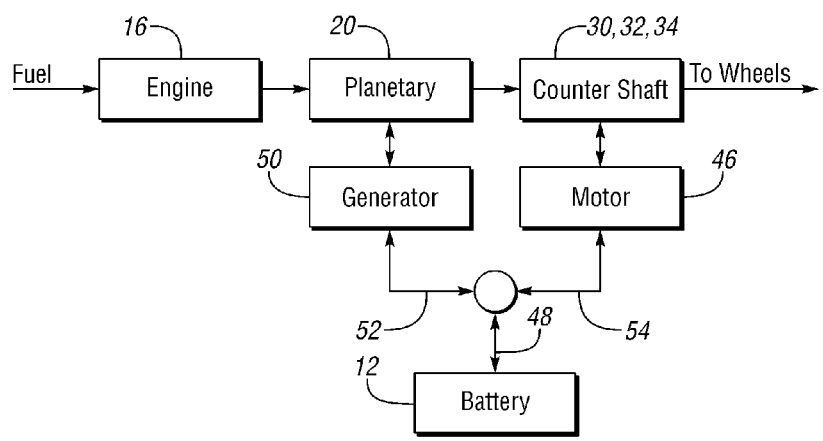
FIG. 2 is a schematic representation, in block diagram form, of a powertrain system power flow diagram.

The power flow paths between the various elements of the powersplit powertrain diagram shown in FIG. 1 are illustrated in FIG. 2. Fueling is scheduled based on driver and other inputs. Engine 16 delivers power to the planetary gear unit 20. The available engine brake power is reduced by accessory loads. Power is delivered by the planetary ring gear to the countershaft gears 30, 32, 34. Power output from the transmission drives the wheels.

Generator 50, when acting as a motor, can deliver power to the planetary gearing. When acting as a generator, generator 50 is driven by the planetary gearing. Similarly, power distribution between the motor 46 and the countershaft gears 30, 32, 34 can be distributed in either direction.

As shown in FIGS. 1 and 2, engine power output can be split into two paths by controlling generator 50. In operation, the system determines the driver's demand for torque and achieves the optimum split of power between the two power sources.

Figure 3:
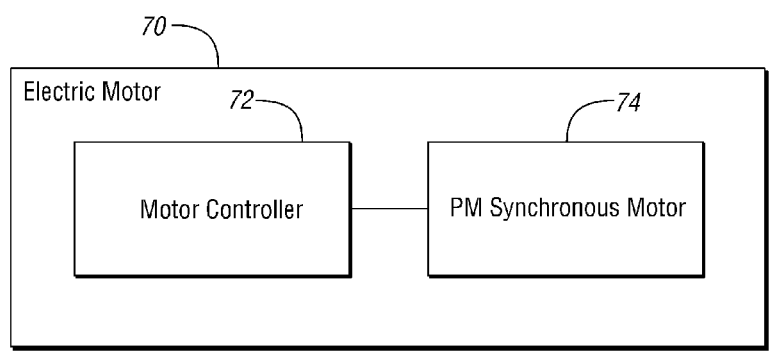
FIG. 3 illustrates an electric motor device, including a motor controller and a permanent magnet (PM) synchronous motor.

FIG. 3 illustrates an electric motor 70. Electric motor 70 includes motor controller 72 and permanent magnet (PM) synchronous motor 74. Electric motor 70 may be controlled in accordance with an embodiment of the invention. Embodiments of the invention are useful in hybrid and electric vehicles that use PM synchronous motors. For example, motor 46 or generator 50 (FIGS. 1 and 2) may be implemented as a PM synchronous motor, and electric motor 70 may represent motor 46 or generator 50. Embodiments of the invention are also useful in other applications, and electric motor 70 may represent some other electric motor.

In general, electric motor 70, in this example, operates by providing a torque command to the motor controller 72 which controls PM synchronous motor 74 and attempts to provide the commanded torque output. Motor controller 72 may receive other inputs such as, for example, available voltage and current motor speed, as appreciated by those skilled in the art.

Figure 4:
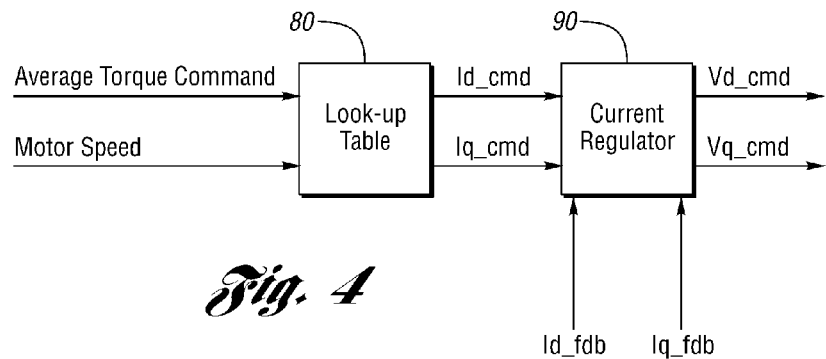
FIG. 4 illustrates controlling a vehicle including a permanent magnet (PM) synchronous motor in a an embodiment of the invention.

In more detail, FIG. 4 illustrates an example method of controlling PM synchronous motor 74. The electric motor is calibrated such that for each average torque command and motor speed, there are corresponding direct-axis (d-axis) and quadrature axis (q-axis) currents Id_cmd and Iq_cmd, respectively, as depicted at look-up table or map 80.

PM synchronous motor 74 is controlled based on Id_cmd and Iq_cmd by current regulator 90. In more detail, current regulator 90 produces d-axis voltage command Vd_cmd and q-axis voltage command Vq_cmd. In turn, feedback d-axis and q-axis currents Id_fdb and Iq_fdb, respectively, are measured in a known manner. Current regulator 90 receives Id_fdb and Iq_fdb.

FIG. 4 is an example of controlling PM synchronous motor 74; other control techniques are possible.

Embodiments of the invention allow motor control to be tuned to minimize torque ripple in certain conditions, for example, at certain motor speed and torque levels. In more detail, look-up table 80 contains control parameters for operating the motor at the various torque/speed pairs. At most torque/speed pairs, control parameters Id current command Id_cmd and Iq current command Iq_cmd may be tuned to minimize losses and maximize fuel efficiency. However, at certain torque/speed pairs, control parameters Id_cmd and Iq_cmd may be tuned to minimize ripple instead of loss, as further explained below with reference to FIGS. 5-7.

Torque ripple is the undesired oscillation of the torque produced by an electric machine around its steady state torque. Torque ripple may cause undesirable noise and vibration. Embodiments of the invention reduce torque ripple by altering the control angle (atan(Id/Iq)). Advantageously, this approach to reducing torque ripple allows noise and vibration concerns to be addressed in an existing electric machine design.

In an existing motor controller, the motor control is tuned or programmed to automatically apply, for a given torque request, the control parameters (Id_cmd, Iq_cmd) that minimize motor losses. In accordance with the invention, the motor control is tuned or programmed to reduce torque ripple at certain torque/speed pairs.

Figure 5:
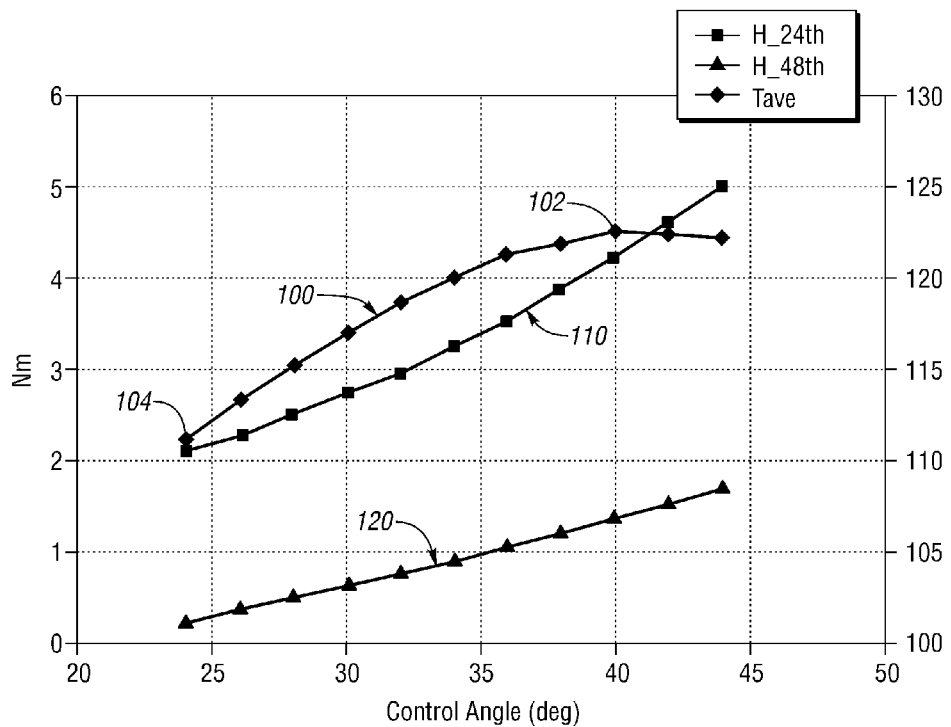
FIG. 5 illustrates average torque and torque harmonics produced by an 8 pole 48 slots interior PM machine at 300 A peak current as a function of the control angle (theta)

The torque harmonics are a strong function of the control angle (atan(Id/Iq)). FIG. 5 illustrates average torque and torque harmonics produced by an 8 pole 48 slots interior PM machine at 300 A peak current as a function of the control angle (theta). The average torque is generally indicated at 100. The optimal control angle from a loss minimization standpoint is theta=40 deg. and is depicted at 102. The optimal control angle for minimal harmonics is theta=26 deg. and is depicted at 104. The 24th harmonic torque is generally indicated at 110. The 48th harmonic torque is generally indicated at 120. As shown, the 24th and 48th harmonics increase dramatically as the control angle approaches the optimal value from a loss minimization standpoint. In HEV, PHEV, BEV traction applications, it is not desirable to continuously operate with control parameters that do not minimize loss. However, if there is a specific motor speed at which there are noise and vibration concerns, applying a new control strategy for that specific operating point will allow torque ripple to be reduced considerably without a significant impact on the vehicle fuel economy.

Figure 6:
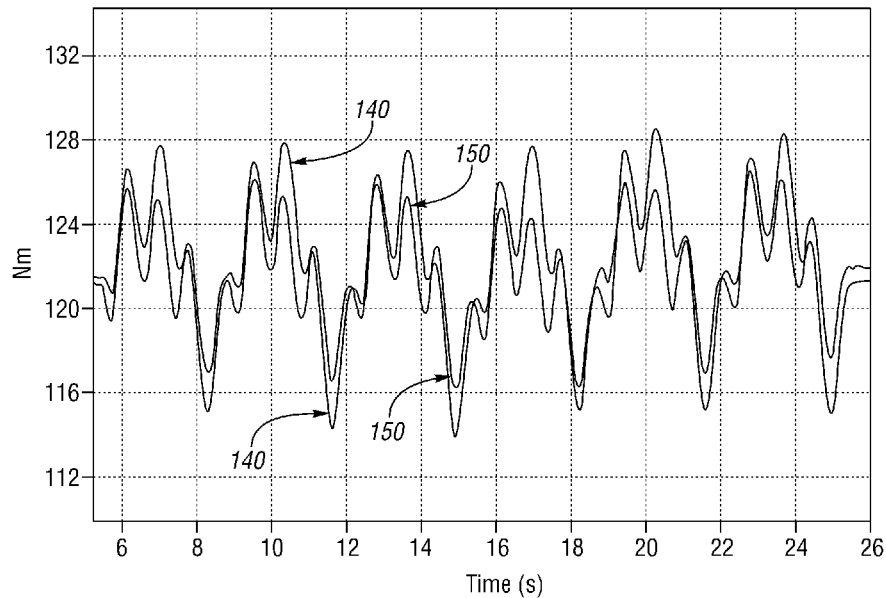
FIG. 6 illustrates a comparison of torque waveforms obtained with control angle optimized for minimal loss (theta=40 deg.) and for minimal torque ripple (theta=26 deg.)

With continuing reference to FIG. 5, in this example, the machine can produce 122 Nm with phase currents of 300 A and control angle theta=40 deg. The same machine can produce the same torque of 122 Nm with phase currents of 350 A and control angle theta=26 deg. as shown in FIG. 6. FIG. 6 illustrates a comparison of torque waveforms obtained with control angle optimized for minimal loss (theta=40 deg.) and for minimal torque ripple (theta=26 deg.). The torque waveform 140 has control angle theta=40 deg. for minimal loss. The torque waveform 150 has control angle theta=26 deg. for minimal torque ripple. The latter control strategy (theta=26 deg.) yields 36% higher winding losses, but reduces the 24th and 48th harmonics to 56.6% and 47.5%, respectively. The first control angle (theta=40 deg.) should be chosen whenever the torque harmonics can be tolerated, the reduced ripple, higher loss control angle (theta=26 deg.) can be chosen to address specific noise and vibration concerns.

The comparison of torque waveforms obtained with control angle optimized for minimal loss (theta=40 deg.) and for minimal torque ripple (theta=26 deg.) is shown in the following table.

TABLE 1

|  |  | theta = 40 deg. | theta = 26 deg. | ratio |
| --- | --- | --- | --- | --- |
| Current | (Apk) | 300 | 350 | 116.70% |
| Winding loss | (%) | 100% | 136% | 136.00% |
| Tave | (Nm) | 122.6 | 121.7 | 99.30% |
| H_24th | (Nm) | 4.22 | 2.39 | 56.60% |
| H_48th | (Nm) | 1.38 | 0.66 | 47.50% |

Figure 7:
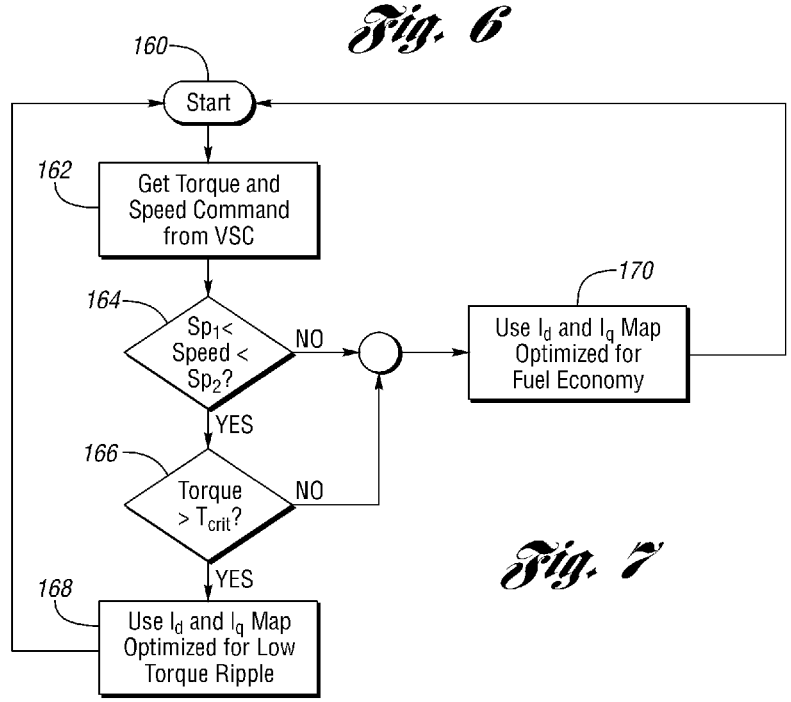
FIG. 7 illustrates a method of reducing torque ripple in an embodiment of the invention.

FIG. 7 illustrates a method of reducing torque ripple in an embodiment of the invention. In this example, a hybrid vehicle has an undesired vibration that occurs when the electric traction motor runs at speed Sp_crit=300 rpm and produces an output torque greater than torque T_crit=120 Nm. To avoid the vibration, the motor controller will have to detect that the motor speed and torque are approaching the critical values. One way to do this is to detect when the speed is between a first speed Sp_1=Sp_crit−delta and a second speed Sp_2=Sp_crit+delta, where delta is a certain amount determined to increase the method robustness, and to detect when the torque is greater than T_crit. When these conditions are detected, the motor controller switches to a special operating mode where the control angle is selected based on reducing ripple rather than minimizing loss. After the speed and torque levels have returned to values that are distant from the critical values, the normal control strategy may be resumed.

In FIG. 7, flow starts at block 160. At block 162, the torque and speed commands are obtained from the vehicle system controller (VSC). At block 164, the motor speed is checked to see if the motor speed is approaching the critical value Sp_crit. At block 166, the torque is checked to see if the torque is approaching the critical torque value T_crit. When it is determined that the motor speed and torque are approaching the critical values, flow proceeds to block 168 and the motor controller uses the I_d and I_q map optimized for low torque ripple. Otherwise, flow proceeds to block 170 and the motor controller uses the I_d and I_q map optimized for fuel economy.

It is appreciated that I_d and I_q commands for low torque ripple may be implemented in a variety of ways. In a first example, a single look-up table or map contains the I_d and I_q commands, and specific portions of the map may contain control parameters I_d and I_q for minimizing ripple instead of loss, while the remainder of the map may contain control parameters I_d and I_q for minimizing loss. In another example, a first look-up table contains control parameters I_d and I_q for minimizing loss; a second look-up table contains control parameters I_d and I_q for minimizing ripple. The speed and torque values are used to select which look-up table is used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for controlling a vehicle including a permanent magnet (PM) synchronous motor, the system comprising a controller configured to:
   control the motor with a motor current and, in the presence of a predetermined condition, alter a control angle of the motor current to increase winding loss and reduce torque ripple with respect to an optimal control angle of the motor current for minimal winding loss.

2. The system of claim 1 wherein the controller is further configured to:
   establish a motor speed; and
   determine the presence of the predetermined condition based on whether the motor speed falls within a predetermined speed range, and further based on whether a torque command exceeds a predetermined value.

3. The system of claim 2 wherein, in the presence of the predetermined condition, the motor current results in decreased control angle of at least 5 degrees with respect to optimal motor current for minimal winding loss.

4. The system of claim 1 wherein, in the presence of the predetermined condition, the motor current results in decreased control angle of at least 5 degrees with respect to optimal motor current for minimal winding loss.

5. A method of controlling a vehicle including a permanent magnet (PM) synchronous motor comprising:
   controlling the motor based on d-axis and q-axis current commands Id and Iq, respectively, corresponding to a torque command; and
   in the presence of a predetermined condition, altering a control angle defined by Id and Iq to increase winding loss and reduce torque ripple relative to an optimal control angle for minimal winding loss.

6. The method of claim 5 wherein, in the absence of the predetermined condition, Id and Iq result in reduced winding loss and increased torque ripple with respect to optimal Id and Iq for minimal torque ripple.

7. The method of claim 6 further comprising:
establishing a motor speed; and
determining the presence of the predetermined condition based on whether the motor speed falls within a predetermined speed range.

8. The method of claim 7 further comprising:
determining the presence of the predetermined condition further based on whether the torque command exceeds a predetermined value.

9. The method of claim 8 wherein, in the presence of the predetermined condition, Id and Iq result in increased peak current with respect to optimal Id and Iq for minimal winding loss.

10. The method of claim 9 wherein, in the presence of the predetermined condition, Id and Iq result in decreased control angle of at least 5 degrees with respect to optimal Id and Iq for minimal winding loss.

11. The method of claim 5 wherein, in the presence of the predetermined condition, Id and Iq result in increased peak current with respect to optimal Id and Iq for minimal winding loss.

12. The method of claim 11 wherein, in the presence of the predetermined condition, Id and Iq result in decreased control angle of at least 5 degrees with respect to optimal Id and Iq for minimal winding loss.

13. A system for controlling a vehicle including a permanent magnet (PM) synchronous motor, the system comprising a controller configured to:
control the motor based on d-axis and q-axis current commands Id and Iq, respectively, corresponding to a torque command; and
in the presence of a predetermined condition, alter a control angle defined by Id and Iq to increase winding loss and reduce torque ripple relative to an optimal control angle for minimal winding loss.

14. The system of claim 13 wherein, in the absence of the predetermined condition, Id and Iq result in reduced winding loss and increased torque ripple with respect to optimal Id and Iq for minimal torque ripple.

15. The system of claim 14 wherein the controller is further configured to:
establish a motor speed; and
determine the presence of the predetermined condition based on whether the motor speed falls within a predetermined speed range.

16. The system of claim 15 wherein the controller is further configured to:
determine the presence of the predetermined condition further based on whether the torque command exceeds a predetermined value.

17. The system of claim 16 wherein, in the presence of the predetermined condition, Id and Iq result in increased peak current with respect to optimal Id and Iq for minimal winding loss.

18. The system of claim 17 wherein, in the presence of the predetermined condition, Id and Iq result in decreased control angle of at least 5 degrees with respect to optimal Id and Iq for minimal winding loss.

19. The system of claim 13 wherein, in the presence of the predetermined condition, Id and Iq result in increased peak current with respect to optimal Id and Iq for minimal winding loss.

20. The system of claim 19 wherein, in the presence of the predetermined condition, Id and Iq result in decreased control angle of at least 5 degrees with respect to optimal Id and Iq for minimal winding loss.

* * * * *